US012652688B2

(12) United States Patent
Xu et al.

(10) Patent No.: US 12,652,688 B2
(45) Date of Patent: Jun. 9, 2026

(54) SUPPLEMENTARY UPLINK SUL CONFIGURATION METHOD AND APPARATUS

(71) Applicant: Huawei Technologies Co., Ltd., Shenzhen (CN)

(72) Inventors: Zhou Xu, Madrid (ES); Liwen Zhang, Shanghai (CN); Xu Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 328 days.

(21) Appl. No.: 18/182,503

(22) Filed: Mar. 13, 2023

(65) Prior Publication Data

US 2023/0217474 A1 Jul. 6, 2023

Related U.S. Application Data

(63) Continuation of application No. PCT/CN2020/115124, filed on Sep. 14, 2020.

(51) Int. Cl.
| | |
|---|---|
| *H04W 72/52* | (2023.01) |
| *H04W 28/02* | (2009.01) |
| *H04W 48/10* | (2009.01) |
| *H04W 72/04* | (2023.01) |
| *H04W 72/54* | (2023.01) |

(52) U.S. Cl.
CPC ....... *H04W 72/52* (2023.01); *H04W 28/0231* (2013.01); *H04W 48/10* (2013.01); *H04W 72/04* (2013.01); *H04W 72/54* (2023.01)

(58) Field of Classification Search
CPC ..... H04W 72/52; H04W 72/04; H04W 72/54; H04W 28/0231; H04W 48/10; H04L 5/001; H04L 5/1469; H04L 5/0062; H04L 5/0048
See application file for complete search history.

(56) References Cited

U.S. PATENT DOCUMENTS

| | | | |
|---|---|---|---|
| 11,601,982 B2 | 3/2023 | Liu et al. | |
| 11,638,188 B2 | 4/2023 | Koskinen et al. | |
| 11,910,213 B2 * | 2/2024 | Ryu ..................... | H04L 5/0053 |
| 2019/0159261 A1 | 5/2019 | Jung et al. | |

(Continued)

FOREIGN PATENT DOCUMENTS

| | | |
|---|---|---|
| CN | 110049557 A | 7/2019 |
| CN | 110351814 A | 10/2019 |

(Continued)

OTHER PUBLICATIONS

"Summary of CB:#1005_SONMDT_LoadBalance," Agenda Item: 22.2, Source: CATT (moderator), Document for: Approval, 3GPP TSG-RAN WG3 #109-e, R3-205660, Online, Aug. 17-27, 2020, 14 pages.

(Continued)

*Primary Examiner* — Robert C Scheibel
(74) *Attorney, Agent, or Firm* — Slater Matsil, LLP

(57) ABSTRACT

In an embodiment a supplementary uplink (SUL) configuration method includes determining, by an access network device, a plurality of synchronization signal blocks (SSBs), wherein each of the plurality of SSBs comprises configuration information of one SUL and broadcasting, by the access network device, the plurality of SSBs on a downlink.

20 Claims, 6 Drawing Sheets

(56) References Cited

U.S. PATENT DOCUMENTS

| | | | | |
|---|---|---|---|---|
| 2020/0328796 A1* | 10/2020 | Turtinen | .............. | H04B 7/0695 |
| 2022/0022247 A1* | 1/2022 | Agiwal | ............. | H04W 72/0453 |
| 2022/0046599 A1* | 2/2022 | Huang | .................. | H04W 72/21 |
| 2022/0417804 A1* | 12/2022 | Freda | .................... | H04W 36/30 |
| 2023/0276410 A1* | 8/2023 | Chen | ................. | H04W 72/1268 |
| | | | | 370/329 |

FOREIGN PATENT DOCUMENTS

| | | | |
|---|---|---|---|
| CN | 111543069 | A | 8/2020 |
| WO | 2019099443 | A1 | 5/2019 |
| WO | 2019099890 | A1 | 5/2019 |

OTHER PUBLICATIONS

"Report on email [107bis#77][2-step RACH] RRC Details and Running RRC CR," Agenda Item: 6/13, Source: Ericsson, Document for: Discussion, Decision, 3GPP TSG-RAN WG2 #108, Tdoc R2-1915787, Reno, Nevada, US, Nov. 18-22, 2019, 13 pages.

"3rd Generation Partnership Project; Technical Specification Group Radio Access Network; NR; NR and NG-RAN Overall Description; Stage 2 (Release 16)," 3GPP TS 38.300 V16.2.0, Jul. 2020, 148 pages.

"Add p-Max for SUL in SIB2 and SIB4," Source to WG: CMCC, Source to TSG: R2, Work item code: NR_newRAT-Core, Date: Sep. 20, 2018, Category: F, Release: Rel-15, Change Request, 38.331, CR 0458, Current Version: 15.3.0, 3GPP TSG-RAN WG2 Meeting #103bis, R2-1815260, Chengdu, China, Oct. 8-12, 2018, 7 pages.

* cited by examiner

SUPPLEMENTARY UPLINK SUL CONFIGURATION METHOD AND APPARATUS

CROSS-REFERENCE TO RELATED APPLICATIONS

This application is a continuation of International Application No. PCT/CN2020/115124, filed on Sept. 14, 2020, the disclosure of which is hereby incorporated by reference in its entirety.

TECHNICAL FIELD

This application relates to communication technologies, and in particular, to a supplementary uplink SUL configuration method and an apparatus.

BACKGROUND

With the development of wireless communication technologies and the rapid growth of mobile user requirements, a wireless communication network requires a high bandwidth and a large capacity.

To improve an uplink transmission capacity, a fifth generation mobile communication technology (5th-Generation, 5G) introduces a supplementary uplink (SUL) for uplink coverage supplement. A terminal device may perform uplink transmission on the SUL, to improve an uplink transmission capacity and a coverage capability of the wireless communication network.

However, how to appropriately use a limited spectrum resource as an SUL operating frequency band resource to improve an uplink transmission capacity becomes a technical problem that urgently needs to be resolved.

SUMMARY

Embodiments provide a supplementary uplink SUL configuration method and an apparatus, to improve uplink transmission capacity.

According to a first aspect, an embodiment of this application provides a supplementary uplink SUL configuration method. The method may include: An access network device determines a plurality of synchronization signal blocks SSBs, where each of the plurality of SSBs includes configuration information of one SUL. The access network device may broadcast the plurality of synchronization signal blocks SSBs on a downlink.

In this implementation, the plurality of SULs are configured for a terminal device by using the plurality of SSBs, so that the terminal device may perform uplink transmission over one of the SULs. In this implementation, the plurality of SULs can be configured, thereby improving an uplink transmission capacity and a coverage capability of a TDD cell, an FDD cell, or an SDL cell. Different terminal devices may perform uplink transmission over different SULs. In this way, available spectrum resources are appropriately used for uplink transmission, to improve uplink transmission performance of a communication system.

In a possible design, time domain resources occupied by the plurality of SSBs do not overlap each other, or frequency domain resources occupied by the plurality of SSBs do not overlap each other.

In this implementation, the plurality of SSBs are sent in a TDM manner, or the plurality of SSBs are sent on different frequency domain resources of one carrier. The configuration information of the plurality of SULs is sent to a terminal device within coverage of the access network device, so that the terminal device may perform uplink transmission by using one of the plurality of SULs based on the configuration information of the plurality of SULs. Different terminal devices may perform uplink transmission over different SULs. In this way, an uplink transmission capacity and a coverage capability are improved.

In a possible design, each of the plurality of SSBs includes configuration information of the downlink, and the plurality of SSBs may include different configuration information of the downlink.

In this implementation, when a plurality of operators are supported, the plurality of operators may use a same DL, but different operators may configure respective SULs, and different operators may have different configuration information of the DL. The plurality of operators share one DL, so that resource usage can be improved.

In a possible design, the method may further include: The access network device determines, based on a capability of a terminal device and link quality of the plurality of SULs and/or resource usage of the plurality of SULs, whether to switch an SUL on which the terminal device camps. The SUL on which the terminal device camps is one of the plurality of SULs.

In this implementation, switching determining is performed based on the capability of the terminal device and the link quality of the plurality of SULs and/or the resource usage of the plurality of SULs. When determining to switch the SUL on which the terminal device camps, the SUL on which the terminal device camps is switched, to optimize uplink transmission of the terminal device, and to improve an uplink transmission capacity and a coverage capability of the access network device.

In a possible design, that the access network device determines, based on a capability of a terminal device and link quality of the plurality of SULs and/or resource usage of the plurality of SULs, whether to switch an SUL on which the terminal device camps may include: When a reference signal received power or a signal to interference plus noise ratio of the SUL on which the terminal device camps is less than a first threshold, or uplink interference is greater than a second threshold, or an uplink bit error rate is greater than a third threshold, or resource usage is greater than a fourth threshold, the access network device determines, based on the capability of the terminal device and the link quality of the plurality of SULs and/or the resource usage of the plurality of SULs, whether to switch the SUL on which the terminal device camps.

In this implementation, uplink transmission of the terminal device can be optimized, to improve an uplink transmission capacity and a coverage capability of the access network device.

In a possible design, the plurality of SULs include a first SUL and a second SUL. The first SUL is the SUL on which the terminal device camps. That the access network device determines, based on a capability of a terminal device and link quality of the plurality of SULs and/or resource usage of the plurality of SULs, whether to switch an SUL on which the terminal device camps may include: When the capability of the terminal device supports the second SUL, and link quality of the first SUL is lower than link quality of the second SUL, and/or resource usage of the first SUL is greater than resource usage of the second SUL, the access network device determines to switch the SUL on which the terminal device camps from the first SUL to the second SUL.

In this implementation, uplink transmission of the terminal device can be optimized, to improve an uplink transmission capacity and a coverage capability of the access network device.

In a possible design, each SUL and the downlink correspond to one logical cell, and different SULs correspond to different logical cells.

In this implementation, each SUL and the downlink correspond to one logical cell, and the logical cell may be a cell obtained by performing logical division on a TDD cell, an FDD cell, or an SDL cell. Logical cell division is performed and a plurality of SSBs used to configure SULs of a plurality of logical cells are broadcast, so that SULs of different logical cells can be configured, to optimize uplink transmission, and to improve an uplink transmission capacity and a coverage capability of the access network device.

According to a second aspect, an embodiment of this application provides a supplementary uplink SUL configuration method. The method may include: A terminal device receives a plurality of synchronization signal blocks SSBs from an access network device on a downlink, where each of the plurality of SSBs includes configuration information of one SUL. The terminal device camps on one of a plurality of SULs.

In this implementation, the terminal device may obtain configuration information of the plurality of SULs by using the plurality of SSBs, and the terminal device may perform uplink transmission over one of the SULs. In this way, available spectrum resources are appropriately used for uplink transmission, to improve uplink transmission performance of a communication system.

In a possible design, time domain resources occupied by the plurality of SSBs do not overlap each other, or frequency domain resources occupied by the plurality of SSBs do not overlap each other.

In a possible design, each of the plurality of SSBs includes configuration information of the downlink, and the plurality of SSBs include different configuration information of the downlink.

According to a third aspect, an embodiment of this application provides a supplementary uplink SUL configuration method. The method may include: An access network device determines one synchronization signal block SSB, where the SSB includes configuration information of one SUL. The access network device broadcasts the SSB on a downlink. The downlink operates on an FDD downlink frequency band.

In this implementation, different from configuring one NUL for one FDD cell, in this embodiment of this application, a plurality of uplinks may be configured for one FDD cell, and the plurality of uplinks include an NUL and one SUL, to improve an uplink transmission capacity and a coverage capability of the FDD cell.

According to a fourth aspect, an embodiment of this application provides a method for configuring switching between a plurality of supplementary uplinks SULs. The method may include: determining, based on a capability of a terminal device and link quality of a plurality of SULs and/or resource usage of a plurality of SULs, whether to switch an SUL on which the terminal device camps; and when determining to switch the SUL on which the terminal device camps, sending a first message to the terminal device, where the first message is used to reconfigure an SUL on which the terminal device is to camp.

In this implementation, an access network device determines, based on the capability of the terminal device and the link quality of the plurality of SULs and/or the resource usage of the plurality of SULs, whether to switch the SUL on which the terminal device camps. When determining to switch the SUL on which the terminal device camps, the access network device sends the first message to the terminal device. The first message is used to reconfigure an SUL on which the terminal device is to camp. The SUL on which the terminal device camps is switched, so that uplink transmission of the terminal device is optimized, to improve an uplink transmission capacity and a coverage capability of the access network device.

According to a fifth aspect, this application provides a communication apparatus. The communication apparatus may be an access network device or a chip or a system on chip or a board in the access network device, or may be a functional module in the access network device that is configured to implement the method according to any one of the first aspect or the possible designs of the first aspect. The communication apparatus may implement a function performed by the access network device in the first aspect or the possible designs of the first aspect, and the function may be implemented by hardware by executing corresponding software. The hardware or the software includes one or more modules corresponding to the foregoing function. For example, in a possible implementation, the communication apparatus may include: a processing module, configured to determine a plurality of synchronization signal blocks SSBs, where each of the plurality of SSBs includes configuration information of one SUL; and a transceiver module, configured to broadcast the plurality of synchronization signal blocks SSBs on a downlink.

In a possible design, time domain resources occupied by the plurality of SSBs do not overlap each other, or frequency domain resources occupied by the plurality of SSBs do not overlap each other.

In a possible design, each of the plurality of SSBs includes configuration information of the downlink, and the plurality of SSBs include different configuration information of the downlink.

In a possible design, the processing module is further configured to determine, based on a capability of a terminal device and link quality of the plurality of SULs and/or resource usage of the plurality of SULs, whether to switch an SUL on which the terminal device camps. The SUL on which the terminal device camps is one of the plurality of SULs.

In a possible design, the processing module is configured to: when a reference signal received power or a signal to interference plus noise ratio of the SUL on which the terminal device camps is less than a first threshold, or uplink interference is greater than a second threshold, or an uplink bit error rate is greater than a third threshold, or resource usage is greater than a fourth threshold, determine, based on the capability of the terminal device and the link quality of the plurality of SULs and/or the resource usage of the plurality of SULs, whether to switch the SUL on which the terminal device camps.

In a possible design, the plurality of SULs include a first SUL and a second SUL. The first SUL is the SUL on which the terminal device camps. The processing module is configured to: when the capability of the terminal device supports the second SUL, and link quality of the first SUL is lower than link quality of the second SUL, and/or resource usage of the first SUL is greater than resource usage of the second SUL, determine to switch the SUL on which the terminal device camps from the first SUL to the second SUL.

In a possible design, each SUL and the downlink correspond to one logical cell, and different SULs correspond to different logical cells.

According to a sixth aspect, this application provides a communication apparatus. The communication apparatus may be an access network device or a chip or a system on chip or a board in the access network device, or may be a functional module in the access network device that is configured to implement the method according to the third aspect. The communication apparatus may implement a function performed by the access network device in the third aspect, and the function may be implemented by hardware by executing corresponding software. The hardware or the software includes one or more modules corresponding to the foregoing function. For example, in a possible implementation, the communication apparatus may include: a processing module, configured to determine one synchronization signal block SSB, where the SSB includes configuration information of one SUL; and a transceiver module, configured to broadcast the SSB on a downlink. The downlink operates on an FDD downlink frequency band.

According to a seventh aspect, this application provides a communication apparatus. The communication apparatus may be a terminal device or a chip or a system on chip or a board in the terminal device, or may be a functional module in the terminal device that is configured to implement the method according to any one of the second aspect or the possible designs of the second aspect. The communication apparatus may implement a function performed by the terminal device in the second aspect or the possible designs of the second aspect, and the function may be implemented by hardware by executing corresponding software. The hardware or the software includes one or more modules corresponding to the foregoing function. For example, in a possible implementation, the communication apparatus may include: a transceiver module, configured to receive a plurality of synchronization signal blocks SSBs from an access network device on a downlink, where each of the plurality of SSBs includes configuration information of one SUL; and a processing module, configured to camp on one of the plurality of SULs by using the transceiver module.

In a possible design, time domain resources occupied by the plurality of SSBs do not overlap each other, or frequency domain resources occupied by the plurality of SSBs do not overlap each other.

In a possible design, each of the plurality of SSBs includes configuration information of the downlink, and the plurality of SSBs include different configuration information of the downlink.

According to an eighth aspect, the communication apparatus may be an access network device or a chip or a system on chip or a board in the access network device, or may be a functional module in the access network device that is configured to implement the method according to the fourth aspect. The communication apparatus may implement a function performed by the access network device in the fourth aspect, and the function may be implemented by hardware by executing corresponding software. The hardware or the software includes one or more modules corresponding to the foregoing function. For example, in a possible implementation, the communication apparatus may include: a processing module, configured to determine, based on a capability of a terminal device and link quality of a plurality of SULs and/or resource usage of a plurality of SULs, whether to switch an SUL on which the terminal device camps. The processing module is further configured to: when determining to switch the SUL on which the terminal device camps, send a first message to the terminal device by using a transceiver module, where the first message is used to reconfigure an SUL on which the terminal device is to camp.

According to a ninth aspect, an embodiment of this application provides a communication apparatus. The communication apparatus may include: one or more processors; and a memory, configured to store one or more programs. When the one or more programs are executed by the one or more processors, the method according to any one of the first aspect or the possible designs of the first aspect is implemented, the method according to the third aspect is implemented, or the method according to the fourth aspect is implemented.

According to a tenth aspect, an embodiment of this application provides a communication apparatus. The communication apparatus may include: one or more processors; and a memory, configured to store one or more programs. When the one or more programs are executed by the one or more processors, the method according to any one of the second aspect or the possible designs of the second aspect is implemented.

According to an eleventh aspect, an embodiment of this application provides a computer-readable storage medium, including a computer program. When the computer program is executed, the method according to any one of the first aspect or the possible designs of the first aspect is implemented, the method according to the third aspect is implemented, or the method according to the fourth aspect is implemented.

According to a twelfth aspect, an embodiment of this application provides a computer-readable storage medium, including a computer program. When the computer program is executed, the method according to any one of the second aspect or the possible designs of the second aspect is implemented.

According to a thirteenth aspect, an embodiment of this application provides a chip, including a processor. The processor is coupled to a memory, the memory is configured to store a computer program, and the processor is configured to invoke and run the computer program stored in the memory, to perform the method according to any one of the first aspect or the possible designs of the first aspect, the method according to the third aspect, the method according to the fourth aspect, or the method according to any one of the second aspect or the possible designs of the second aspect.

According to a fourteenth aspect, an embodiment of this application provides a computer program product, including instructions. When the instructions are run on a computer, the computer is enabled to perform the method according to any one of the first aspect or the possible designs of the first aspect, the method according to the third aspect, the method according to the fourth aspect, or the method according to any one of the second aspect or the possible designs of the second aspect.

According to the supplementary uplink SUL configuration method and the apparatus in embodiments of this application, a plurality of SSBs are broadcast on a DL, and a plurality of SULs are configured for a terminal device by using the plurality of SSBs, so that the terminal device can perform uplink transmission over one of the SULs. Different from configuring one SUL for one TDD cell, configuring one uplink for one FDD cell, or configuring one SUL for one SDL cell, a plurality of SULs may be configured in embodiments of this application, to improve an uplink transmission capacity and a coverage capability of an access network device. Different terminal devices may perform uplink transmission over different SULs. In this way, available spectrum resources are appropriately used for uplink transmission, to improve uplink transmission performance of a communication system.

DETAILED DESCRIPTION OF ILLUSTRATIVE EMBODIMENTS

The terms "first", "second", and the like in this application are for descriptive purposes only and should not be construed as indicating or implying relative importance or be construed as indicating or implying a sequence. In addition, the terms "include", "have", and any other variant thereof are intended to cover a non-exclusive inclusion, for example, include a series of steps or units. Methods, systems, products, or devices are not necessarily limited to those steps or units that are literally listed, but may include other steps or units that are not literally listed or that are inherent to such processes, methods, products, or devices.

It can be understood that in this application, "at least one (item)" refers to one or more and "a plurality of" refers to two or more. The term "and/or" is used for describing an association relationship between associated objects, and represents that three relationships may exist. For example, "A and/or B" may represent the following three cases: Only A exists, only B exists, and both A and B exist, where A and B may be singular or plural. The character "/" generally indicates an "or" relationship between the associated objects. "At least one of the following items (pieces)" or a similar expression thereof indicates any combination of these items, including a single item (piece) or any combination of a plurality of items (pieces). For example, at least one (piece) of a, b, or c may represent: a, b, c, "a and b", "a and c", "b and c", or "a, b, and c", where a, b, and c may be singular or plural.

Figures 1, 2A:
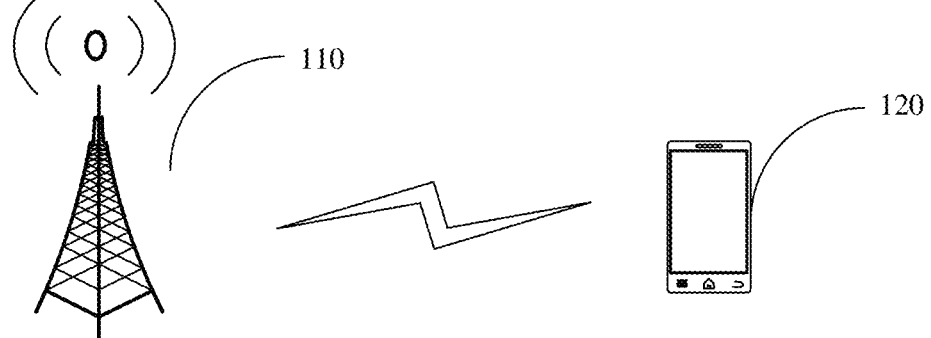
FIG. 1 is a schematic diagram of an architecture of a communication system to which an embodiment of this application is applied.
FIG. 2A is a schematic diagram of an SUL scenario according to an embodiment of this application.

FIG. 1 is a schematic diagram of an architecture of a communication system to which an embodiment of this application is applied. As shown in FIG. 1, the communication system includes at least one access network device no and at least one terminal device (for example, a terminal device 120 in FIG. 1). The terminal device 120 may be connected to the access network device 110 in a wireless manner. The terminal device may be located at a fixed location, or may be mobile. FIG. 1 is only a schematic diagram. The communication system may further include another network device, for example, a core network device, which is not shown in FIG. 1. Quantities of access network devices and terminal devices included in the communication system are not limited in this embodiment of this application. For example, the communication system may include any quantity of access network devices, for example, two, three, or six access network devices, and the communication system may include any quantity of terminal devices, for example, two, three, or six terminal devices.

The access network device no may be a transmission reception point (TRP), a base station, a relay station, a node, an access point, or the like. The access network device no may be an access network device in a 5G communication system or an access network device in a future evolved network, or may be a wearable device, a vehicle-mounted device, or the like. In addition, the access network device may alternatively be a base transceiver station (BTS) in a global system for mobile communication (GSM) or a code division multiple access (CDMA) network, an NB (NodeB) in wideband code division multiple access (WCDMA), or an eNB or eNodeB (evolved NodeB) in long term evolution (LTE). The access network device no may alternatively be a radio controller in a cloud radio access network (CRAN) scenario. Alternatively, the access network device no may use an architecture in which a central unit (CU) and a distributed unit (DU) are separated. CU-DU division may be performed based on protocol stacks. In a possible manner, a radio resource control (RRC) layer, a service data adaptation protocol (SDAP) layer, and a packet data convergence protocol (PDCP) layer are deployed in the CU, and other layers, namely, a radio link control (RLC) layer, a media access control (MAC) layer, and a physical (PHY) layer are deployed in the DU. A base station is used as an example for description in embodiments of this application.

The terminal device may also be referred to as a terminal, user equipment (UE), a mobile station (MS), a mobile terminal (MT), or the like. The terminal device may be a mobile phone (mobile phone), a tablet computer (Pad), a computer having a wireless transceiver function, a virtual reality (VR) terminal device, an augmented reality (AR) terminal device, a wireless terminal in industrial control, a wireless terminal in assisted driving, a wireless terminal in self-driving, a wireless terminal in remote medical surgery, a wireless terminal in a smart grid, a wireless terminal in transportation safety, a wireless terminal in a smart city, a wireless terminal in a smart home, or the like.

The access network device and the terminal device may be deployed on land, and include an indoor or outdoor device, a handheld device, or a vehicle-mounted device; or may be deployed on water; or may be deployed on a plane, a balloon, and a satellite in air. Application scenarios of the access network device and the terminal device are not limited in embodiments of this application.

Figure 2B:
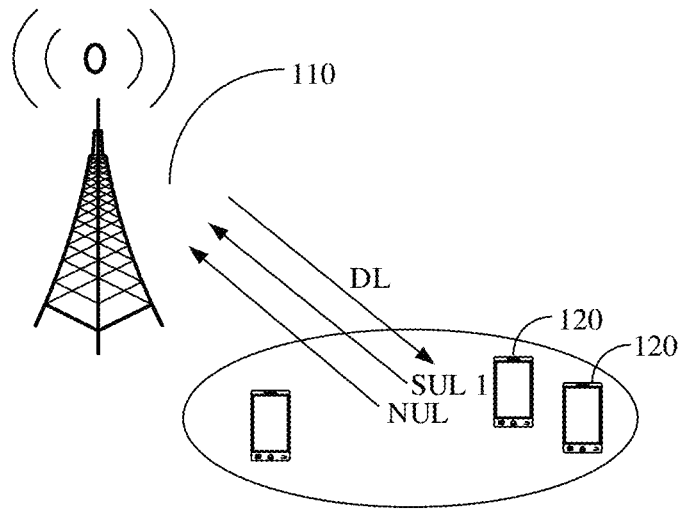
FIG. 2B is another schematic diagram of an SUL scenario according to an embodiment of this application.
Figure 2C:
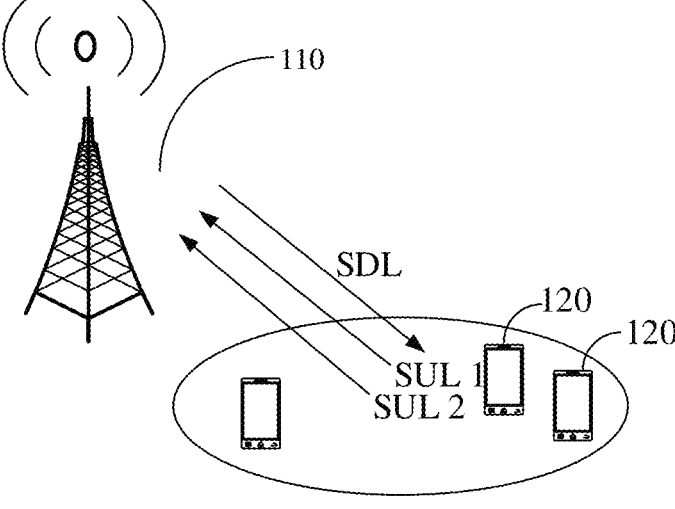
FIG. 2C is still another schematic diagram of an SUL scenario according to an embodiment of this application.

The communication system shown in FIG. 1 supports a supplementary uplink (SUL) scenario. FIG. 2A to FIG. 2C each are a schematic diagram of an SUL scenario according to an embodiment of this application. As shown in FIG. 2A to FIG. 2C, the access network device no may provide one downlink (DL) and a plurality of uplinks (ULs) for the terminal device 120.

In a possible application scenario, the access network device no may provide one DL and at least three ULs for the terminal device 120. The at least three ULs may include one normal uplink (NUL) and at least two supplementary uplinks (SULs). The NUL and the DL use a time division duplex (TDD) manner or a frequency division duplex (FDD) manner for transmission. Three ULs are used as an example. Refer to FIG. 2A. The three ULs may be an NUL, an SUL 1, and an SUL 2 shown in FIG. 2A.

In another possible application scenario, as shown in FIG. 2B, the access network device no may provide one DL and two ULs for the terminal device 120, and the two ULs may include a normal uplink (NUL) and a supplementary uplink (SUL). The NUL and the DL use an FDD manner for transmission. The two ULs may be an NUL and an SUL 1 shown in FIG. 2B.

In still another application scenario, the access network device no may provide one DL and at least two ULs for the terminal device 120. The one DL may be a supplementary downlink (SDL), and the at least two ULs may be at least two SULs. Two SULs are used as an example. As shown in FIG. 2C, the two SULs may be an SUL 1 and an SUL 2. Optionally, different from the FDD manner used by the NUL and the DL for transmission, the SDL and the SUL in this application scenario may not use symmetric frequency band resources. For example, the SUL uses an uplink frequency band resource of an FDD frequency band 1, and the SDL may use a downlink frequency band resource of an FDD frequency band 2.

An example in which the access network device no provides one NUL and one SUL (for example, the SUL 1 shown in FIG. 2B) for the terminal device 120 is used for description. The access network device no broadcasts one synchronization signal block (SSB) on a DL. The SSB may include configuration information of the NUL and configuration information of the SUL. The terminal device 120 may perform uplink transmission by using the NUL or the SUL based on the configuration information of the NUL and the configuration information of the SUL. The access network device configures the SUL to improve an uplink transmission capacity and a coverage capability.

The access network device that provides the NUL and the DL that use a TDD operating mode may configure a plurality of SULs for a terminal device in a TDD cell by using an SUL configuration method provided in this embodiment of this application, so that the terminal device may perform uplink transmission over one of the SULs. Different from configuring one SUL for one TDD cell, in this embodiment of this application, a plurality of SULs may be configured for one TDD cell, and different terminal devices in the TDD cell may perform uplink transmission over different SULs, to improve an uplink transmission capacity and a coverage capability of the TDD cell. The access network device may appropriately use available spectrum resources to perform uplink transmission, to improve uplink transmission performance of a communication system. The TDD cell in this embodiment is a physical cell that uses the TDD operating mode. The TDD cell may be divided into a plurality of logical cells, one of the plurality of SULs and the NUL may correspond to one logical cell, and different SULs in the plurality of SULs may correspond to different logical cells.

The access network device that provides the NUL and the DL that uses an FDD operating mode may configure one or more SULs for a terminal device in an FDD cell by using an SUL configuration method provided in this embodiment of this application, so that the terminal device may perform uplink transmission over one of the SULs. Different from configuring one uplink for one FDD cell, in this embodiment of this application, a plurality of uplinks may be configured for one FDD cell, and the plurality of uplinks include an NUL and one or more SULs, to improve an uplink transmission capacity and a coverage capability of the FDD cell. When the plurality of SULs are configured, different terminal devices in the FDD cell may perform uplink transmission over different SULs. In this way, available spectrum resources are appropriately used for uplink transmission, to improve uplink transmission performance of a communication system. The FDD cell in this embodiment is a physical cell that uses the FDD operating mode. The FDD cell may be divided into a plurality of logical cells, one of the one or more SULs and the NUL may correspond to one logical cell, and different SULs in the plurality of SULs may correspond to different logical cells.

The access network device that provides the SUL and the SDL may configure a plurality of SULs for a terminal device in an SDL cell by using an SUL configuration method provided in this embodiment of this application, so that the terminal device may perform uplink transmission over one of the SULs. Different from configuring one SUL for one SDL cell, in this embodiment of this application, a plurality of SULs may be configured for one SDL cell, to improve an uplink transmission capacity and a coverage capability of the SDL cell. When the plurality of SULs are configured, different terminal devices in the SDL cell may perform uplink transmission over different SULs. In this way, available spectrum resources are appropriately used for uplink transmission, to improve uplink transmission performance of a communication system. The SDL cell in this embodiment is a physical cell. The SDL cell may be divided into a plurality of logical cells, one of the plurality of SULs may correspond to one logical cell, and different SULs in the plurality of SULs may correspond to different logical cells.

The following uses several specific embodiments to explain and describe the SUL configuration method in embodiments of this application.

Figure 3:
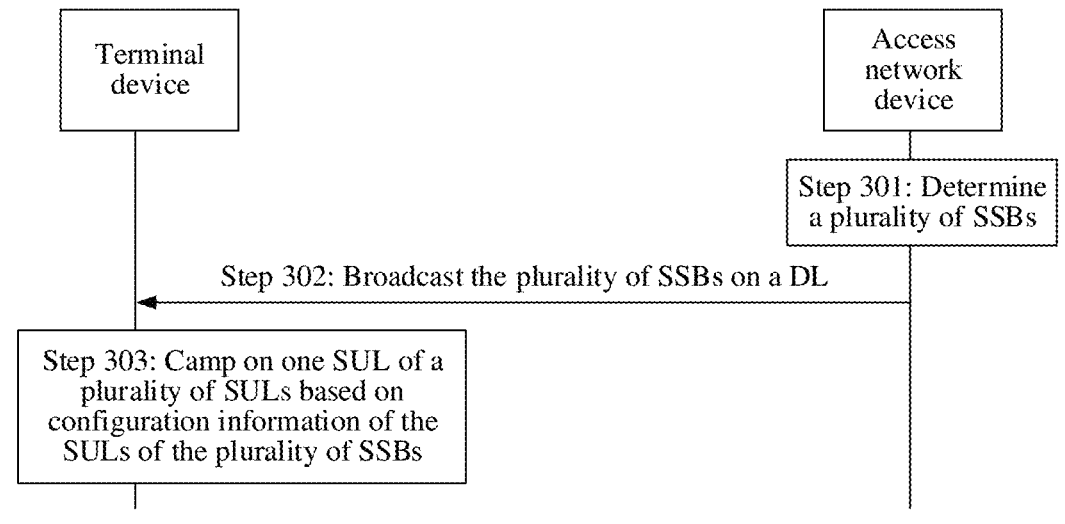
FIG. 3 is a flowchart of an SUL configuration method according to an embodiment of this application.

FIG. 3 is a flowchart of an SUL configuration method according to an embodiment of this application. An access network device and a terminal device are used as an example for description in this embodiment. As shown in FIG. 3, the method in this embodiment may include the following steps.

Step 301: The access network device determines a plurality of SSBs.

Each of the plurality of SSBs may include configuration information of one or more SULs, and the configuration information of one SUL is used to configure the SUL. The configuration information of the SUL may include information such as a frequency and a bandwidth of the SUL. A frequency indicated by frequency information of the SUL is not limited in this embodiment. For example, the frequency indicated by the frequency information of the SUL may be 1.8 GHz or 700 MHz.

When each of the plurality of SSBs includes configuration information of one SUL, configuration information of SULs of different SSBs is different. For example, frequency information of the SULs of the different SSBs is different. For example, the plurality of SSBs include an SSB 1 and an SSB 2, configuration information of an SUL of the SSB 1 may include frequency information of an SUL 1, and configuration information of an SUL of the SSB 2 may include frequency information of an SUL 2. The frequency information of the SUL 1 is different from the frequency information of the SUL 2. Different frequency information indicates different frequencies. Frequencies of SULs that are configured by using different SSBs may be different frequencies with a same bandwidth or different frequencies with different bandwidths. The frequencies of the SULs that are configured by using the different SSBs may be different contiguous frequencies or different discontiguous frequencies.

When each of the plurality of SSBs includes configuration information of a plurality of SULs, configuration information of a plurality of SULs of a same SSB is different. For example, frequency information of different SULs of the same SSB is different. For example, the SSB may include configuration information of an SUL 1 and configuration information of an SUL 2, and frequency information of the SUL 1 is different from frequency information of the SUL 2.

The plurality of SSBs may be SSBs sent on a DL of a TDD cell of the access network device, or may be SSBs sent on a DL of an FDD cell of the access network device, or may be SSBs sent on an SDL of an SDL cell of the access network device. The TDD cell, the FDD cell, and the SDL cell are all physical cells. The TDD cell may be logically divided into a plurality of sub-cells, the FDD cell may be logically divided into a plurality of sub-cells, and the SDL cell may be logically divided into a plurality of sub-cells. A sub-cell may also be referred to as a logical cell.

Optionally, each of the plurality of SSBs may further include configuration information of an NUL, and the configuration information of the NUL is used to configure the NUL. The configuration information of NUL may include information such as a frequency and a bandwidth of the NUL. For example, for the application scenarios shown in FIG. 2A and FIG. 2B, the SSB sent by the access network device may further include the configuration information of the NUL. Configuration information of NULs of different SSBs may be the same or may be different.

For example, the access network device may determine a plurality of SSBs based on a plurality of available operating frequency bands, to configure a plurality of SULs for the terminal device by using the plurality of SSBs. In this way, an uplink transmission capacity and a coverage capability of the access network device are improved. The plurality of available operating frequency bands may include a frequency band corresponding to the configuration information of the SUL of each SSB, and the frequency band corresponding to the configuration information of the SUL may be determined based on frequency information and bandwidth information that are included in the configuration information of the SUL.

Step 302: The access network device broadcasts the plurality of SSBs on a DL.

Correspondingly, the terminal device receives the plurality of SSBs on the DL. The DL may be the DL in each of the application scenarios shown in FIG. 2A and FIG. 2B, or may be the SDL in the application scenario shown in FIG. 2C. The plurality of SULs configured by using the plurality of SSBs correspond to a same DL. An example in which the SUL 1 is configured by using the SSB 1, and the SUL 2 is configured by using the SSB 2 is used for further description. Both the SUL 1 and the SUL 2 correspond to the DL, a sub-cell 1 may include the DL and the SUL 1, and a sub-cell 2 may include the DL and the SUL 2.

Optionally, when the SSB 1 further includes configuration information of an NUL, and the SSB 2 further includes configuration information of an NUL, the sub-cell 1 may include the DL, the NUL, and the SUL 1, and the sub-cell 2 may include the DL, the NUL, and the SUL 2. The DL and the NUL may use a TDD or FDD operating mode. The NUL of the sub-cell 1 and the NUL of the sub-cell 2 may be the same or may be different. A difference between the NUL of the sub-cell 1 and the NUL of the sub-cell 2 may lie in frequencies and/or bandwidths of the NULs.

The access network device may broadcast and send the plurality of SSBs on a same DL in a staggered manner in time domain or frequency domain. The following provides description with reference to Manner 1 and Manner 2.

Manner 1: The plurality of SSBs occupy different time domain resources. In other words, the access network device sends the plurality of SSBs in a time division multiplexing (TDM) manner.

It may be understood that time domain resources occupied by any two SSBs in the plurality of SSBs are different, and a difference herein may be understood as non-overlapping. For example, the plurality of SSBs include the SSB 1 and an SSB 3, and time domain resources occupied by the SSB 1 and the SSB 3 are completely different. The SSB 1 occupies a time domain resource 1, and the SSB 3 occupies a time domain resource 3. The time domain resource 1 and the time domain resource 3 do not overlap.

Manner 2: The plurality of SSBs occupy different frequency domain resources. In other words, the access network device may send the plurality of SSBs on different frequency domain resources of one carrier.

It may be understood that frequency domain resources occupied by any two SSBs in the plurality of SSBs are different, and a difference herein may be understood as non-overlapping. For example, the plurality of SSBs include the SSB 1 and an SSB 3, and frequency domain resources occupied by the SSB 1 and the SSB 3 are completely different. The SSB 1 occupies a frequency domain resource 1, and the SSB 3 occupies a frequency domain resource 3. The frequency domain resource 1 and the frequency domain resource 3 do not overlap.

In Manner 1 and Manner 2, the plurality of SSBs may be cell-defining SSBs. The cell-defining SSB may be associated with remaining minimum system information (RMSI), and the RMSI may carry cell identification information. The terminal device may determine an SUL serving cell (also referred to as a sub-cell) based on the cell-defining SSB. For example, when an SUL is configured by using an SSB, the SSB is associated with RMSI. The RMSI carries an NR cell global identifier (NCGI). The NCGI is used to identify one sub-cell, that is, the NCGI is used to identify the sub-cell corresponding to the SUL. The cell corresponding to the SUL may be a cell including the SUL, an NUL, and a DL, or may be a cell including the SUL and an SDL. Different SULs may correspond to different NCGIs, that is, correspond to different sub-cells.

Optionally, in some embodiments, in addition to broadcasting the plurality of SSBs, that is, the plurality of cell-defining SSBs, the access network device may further broadcast a non-cell-defining SSB, where the non-cell-defining SSB has no associated RMSI, and the non-cell-defining SSB is used for radio resource management (RRM) measurement.

Figure 4A:
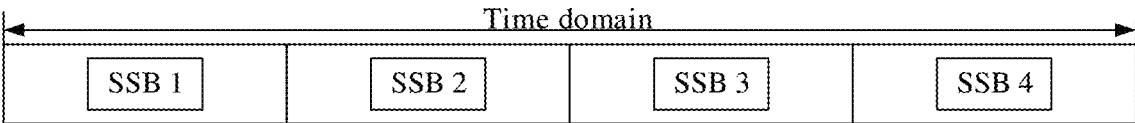
FIG. 4A is a schematic diagram of sending a plurality of SSBs according to an embodiment of this application.

For example, an embodiment shown in FIG. 4A is used to explain and describe the foregoing Manner 1. As shown in FIG. 4A, the access network device sends the SSB 1 and the SSB 3 on different time domain resources. The SSB 1 is used to configure the SUL 1, and the SSB 3 is used to configure the SUL 2. The SUL 1 may correspond to the sub-cell 1, and an NCGI of the sub-cell 1 may be an NCGI 5. The SUL 2 may correspond to the sub-cell 2, and an NCGI of the sub-cell 2 may be an NCGI 6. In some embodiments, the access network device may further send the SSB 2 and an SSB 4. Different from the SSB 1 and the SSB 3, the SSB 2 and the SSB 4 are non-cell-defining SSBs, and may be used for RRM measurement.

Figure 4B:
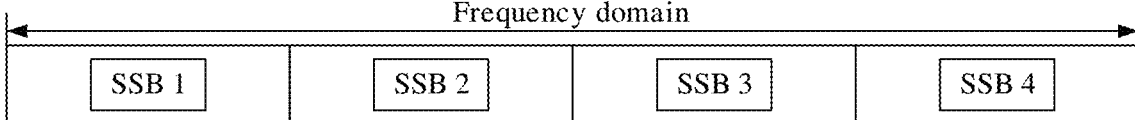
FIG. 4B is another schematic diagram of sending a plurality of SSBs according to an embodiment of this application.

An embodiment shown in FIG. 4B is used to explain and describe the foregoing Manner 2. As shown in FIG. 4B, the access network device sends the SSB 1 and the SSB 3 on different frequency domain resources. The SSB 1 is used to configure the SUL 1, and the SSB 3 is used to configure the SUL 2. The SUL 1 may correspond to the sub-cell 1, and an NCGI of the sub-cell 1 may be equal to 5. The SUL 2 may correspond to the sub-cell 2, and an NCGI of the sub-cell 2 may be equal to 6. In some embodiments, the access network device may further send the SSB 2 and an SSB 4. Different from the SSB 1 and the SSB 3, the SSB 2 and the SSB 4 are non-cell-defining SSBs, and may be used for RRM measurement.

Optionally, each of the plurality of SSBs in step 301 and step 302 may further include configuration information of the DL, and configuration information of the DL included in different SSBs may be the same or may be different. For example, when a plurality of operators are supported, the plurality of operators may use a same DL, but different operators may configure respective SULs, and different operators may have different configuration information of the DL. For example, public land mobile network (PLMN) information in the configuration information of the DL of the different operators is different.

Step 303: The terminal device camps on one of the plurality of SULs based on the configuration information of the SULs of the plurality of SSBs.

In an implementation, the terminal device may randomly camp on one of the plurality of SULs based on the configuration information of the SULs of the plurality of SSBs. For example, random access is performed on one SUL, and then uplink transmission is performed on the SUL.

Optionally, when the SSB further includes the configuration information of the NUL, the terminal device may randomly camp on the NUL or one of the plurality of SULs based on the configuration information of the NUL and the configuration information of the plurality of SULs. FIG. 4A is used as an example. The SSB 1 and the SSB 3 further include configuration information of an NUL, and the configuration information of the NUL includes information such as a frequency and a bandwidth of the NUL. For example, the frequency indicated by the frequency information of the NUL is 2.6 GHz, a frequency of the SUL 1 indicated by frequency information of the SUL 1 included in the SSB 1 is 1.8 GHz, and a frequency of the SUL 2 indicated by frequency information of the SUL 2 included in the SSB 3 is 700 MHz.

Notably, for another terminal device within coverage of the FDD cell, the TDD cell, or the SDL cell, the terminal device may perform random access in a manner same as that in step 303.

In this embodiment, the access network device broadcasts the plurality of SSBs on the DL, and configures the plurality of SULs for the terminal device by using the plurality of SSBs, so that the terminal device may perform uplink transmission over one of the SULs. Different from configuring one SUL for one TDD cell, configuring one uplink for one FDD cell, or configuring one SUL for one SDL cell, a plurality of SULs may be configured in this embodiment of this application, to improve an uplink transmission capacity and a coverage capability of the TDD cell, the FDD cell, or the SDL cell. Different terminal devices may perform uplink transmission over different SULs. In this way, available spectrum resources are appropriately used for uplink transmission, to improve uplink transmission performance of a communication system.

After configuring the plurality of SULs, the access network device may further determine, based on a capability of the terminal device and link quality of the plurality of SULs and/or resource usage of the plurality of SULs, whether to switch the SUL on which the terminal device camps. When determining to switch the SUL on which the terminal device camps, the terminal device switches to another SUL, to optimize uplink transmission efficiency of the terminal device.

Notably, the plurality of SULs may be configured by using the method in the embodiment shown in FIG. 3, or the plurality of SULs may be configured by using another method. Switching determining and a configuration manner before switching between the plurality of SULs are not specifically limited in this embodiment of this application.

The capability of the terminal device indicates a frequency or a frequency range supported by the terminal device. The link quality of each of the plurality of SULs may be represented in one or more of the following: reference signal received power (RSRP), a signal to interference plus noise ratio (SINR), uplink interference (traffic statistics), or an uplink bit error rate IBLER (calculated based on an ACK/a NACK). A higher RSRP indicates better link quality, and a lower RSRP indicates poorer link quality. A higher SINR indicates better link quality. Conversely, a lower SINR indicates poorer link quality. The RSRP and the SINR may be determined by measuring a sounding reference signal (SRS). Weaker uplink interference indicates better link quality. Conversely, stronger uplink interference indicates poorer link quality. A lower IBLER indicates better link quality. Conversely, a higher IBLER indicates poorer link quality. The resource usage of each of the plurality of SULs may indicate a proportion of RB resources of the SUL that have been used by one or more terminal devices in a cell corresponding to the SUL to available RB resources of the SUL. Higher resource usage indicates higher load of the SUL.

The following uses a specific embodiment as an example to describe an implementation of switching the SUL on which the terminal device camps.

Figures 5, 6:
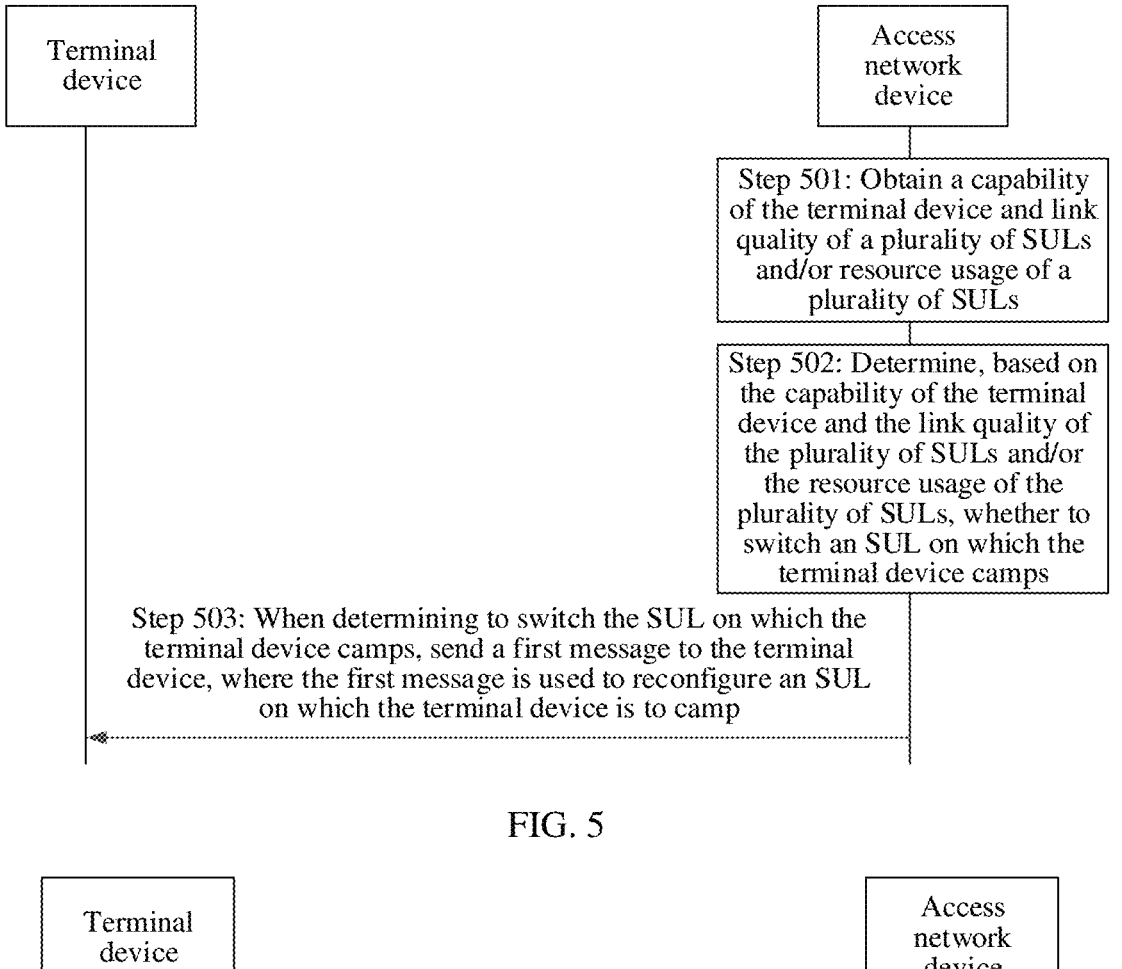
FIG. 5 is a flowchart of a method for configuring switching between a plurality of SULs according to an embodiment of this application.
FIG. 6 is a flowchart of another SUL configuration method according to an embodiment of this application.

FIG. 5 is a flowchart of a method for configuring switching between a plurality of SULs according to an embodiment of this application. An access network device and a terminal device are used as an example for description in this embodiment. As shown in FIG. 5, the method in this embodiment may include the following steps.

Step 501: The access network device obtains a capability of a terminal device and link quality of a plurality of SULs and/or resource usage of a plurality of SULs.

Step 502: The access network device determines, based on the capability of the terminal device and the link quality of the plurality of SULs and/or the resource usage of the plurality of SULs, whether to switch an SUL on which the terminal device camps.

The SUL on which the terminal device camps is one of the plurality of SULs.

In this embodiment of this application, the plurality of SULs may be configured by using the method in the embodiment shown in FIG. 3, or the plurality of SULs may be configured by using another method, and then switching determining is performed through step 501 and step 502. For explanations and descriptions of the capability of the terminal device, the link quality, and the resource usage, refer to the foregoing explanations and descriptions. Details are not described herein again.

Optionally, before step 501, the switching determining may alternatively be triggered based on at least one of the following: coverage strength, load, or interference of the SUL on which the terminal device camps. For example, before step 501, the access network device determines whether the SUL on which the terminal device camps meets one or more of the following: an RSRP or an SINR of the SUL on which the terminal device camps is less than a first threshold, or uplink interference is greater than a second threshold, or an uplink bit error rate is greater than a third threshold, or resource usage is greater than a fourth threshold. When the RSRP or the SINR of the SUL on which the terminal device camps is less than the first threshold, or the uplink interference is greater than the second threshold, or the uplink bit error rate is greater than the third threshold, or the resource usage is greater than the fourth threshold, the access network device performs step 501 and step 502.

In some embodiments, the plurality of SULs may include a first SUL and a second SUL, and the first SUL is the SUL on which the terminal device camps. An implementation of step 502 is as follows: when the capability of the terminal device supports the second SUL, and link quality of the first SUL is lower than link quality of the second SUL, and/or resource usage of the first SUL is greater than resource usage of the second SUL, determining to switch the SUL on which the terminal device camps from the first SUL to the second SUL; or when the capability of the terminal device does not support the second SUL, or link quality of the first SUL is higher than link quality of the second SUL, or resource usage of the first SUL is less than resource usage of the second SUL, determining not to switch the SUL on which the terminal device camps.

Based on the switching determining, when it is determined to switch the SUL on which the terminal device camps, the SUL on which the terminal device camps may be switched by performing the following step 503. When it is determined not to switch the SUL on which the terminal device camps, the SUL on which the terminal device camps remains unchanged.

Notably, in some embodiments, the link quality of the plurality of SULs may alternatively be uplink quality obtained by the access network device based on downlink quality reported by the terminal device. The terminal device may perform downlink measurement on FDD frequency bands to which the plurality of SULs belong, to obtain a measurement result, and then report the measurement result to the access network device. The access network device may obtain respective link quality of the plurality of SULs by analogy based on the downlink quality represented by the measurement result. A manner of determining the link quality of the SUL is not specifically limited in this embodiment of this application.

Step 503: When determining to switch the SUL on which the terminal device camps, the access network device sends a first message to the terminal device, where the first message is used to reconfigure an SUL on which the terminal device is to camp.

The terminal device receives the first message sent by the access network device. For example, the first message may be an RRC reconfiguration message. The terminal device switches the SUL on which the terminal device camps based on the first message, to implement switching between different SULs.

In this embodiment, the access network device determines, based on the capability of the terminal device and the link quality of the plurality of SULs and/or the resource usage of the plurality of SULs, whether to switch the SUL on which the terminal device camps. When determining to switch the SUL on which the terminal device camps, the access network device sends the first message to the terminal device. The first message is used to reconfigure an SUL on which the terminal device is to camp. The SUL on which the terminal device camps is switched, so that an uplink transmission capacity and a coverage capability of the access network device are improved.

FIG. 6 is a flowchart of another SUL configuration method according to an embodiment of this application. An access network device and a terminal device are used as an example for description in this embodiment. This embodiment is applicable to an FDD cell. As shown in FIG. 6, the method in this embodiment may include the following steps.

Step 601: The access network device determines one SSB of an FDD cell.

The SSB includes configuration information of one SUL. For specific explanations and descriptions of the configuration information of the SUL, refer to related explanations and descriptions in step 301 in the embodiment shown in FIG. 3. Details are not described herein again.

The SSB may be an SSB sent on a DL of one FDD cell of the access network device.

The SSB in this embodiment may be a cell-defining SSB (SSB).

Optionally, for the FDD cell, the SSB may further include configuration information of an NUL, and the configuration information of the NUL is used to configure the NUL. The SUL configured by using the SSB may be used as an uplink supplement to the NUL to improve an uplink transmission capacity and a coverage capability of the access network device.

Step 602: The access network device broadcasts the SSB on a DL.

The terminal device receives the SSB on the DL.

Step 603: The terminal device camps on the SUL based on the configuration information of the SUL of the SSB, and performs uplink transmission by using the SUL.

In an implementation, the terminal device may camp on the corresponding SUL based on the configuration information of the SUL of the SSB. For example, random access is performed on the SUL, and then uplink transmission is performed on the SUL.

Optionally, for the FDD cell, when the SSB further includes the configuration information of the NUL, the terminal device may randomly camp on the NUL or the SUL based on the configuration information of the NUL and the configuration information of the SUL.

In this embodiment, the access network device broadcasts one SSB on the DL, and configures one SUL for the terminal device by using the SSB, so that the terminal device may perform uplink transmission on the SUL. Different from configuring one NUL for one FDD cell, one SUL may be configured for the FDD cell in this embodiment of this application, to improve an uplink transmission capacity and a coverage capability of the FDD cell. The terminal device may perform uplink transmission by using the SUL. In this way, available spectrum resources are appropriately used for uplink transmission, to improve uplink transmission performance of a communication system.

The foregoing describes the communication resource scheduling method provided in embodiments of this application, and the following describes a communication apparatus provided in embodiments of this application.

Figure 7:
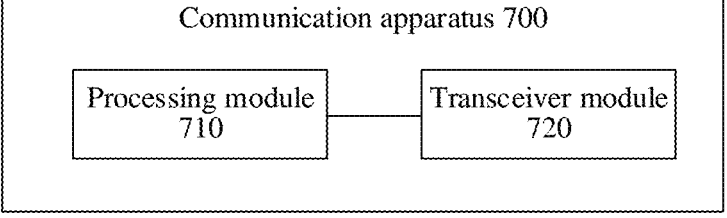
FIG. 7 is a schematic diagram of a communication apparatus 700 according to an embodiment of this application.

FIG. 7 is a schematic diagram of a communication apparatus 700 according to an embodiment of this application. The communication apparatus 700 includes:

a processing module 710, configured to determine a plurality of synchronization signal blocks SSBs, where each of the plurality of SSBs includes configuration information of one or more SULs; and a transceiver module 720, configured to broadcast the plurality of synchronization signal blocks SSBs on a downlink.

In some embodiments, the plurality of SSBs occupy different time domain resources, or the plurality of SSBs occupy different frequency domain resources.

In some embodiments, each of the plurality of SSBs includes configuration information of the downlink, and the plurality of SSBs include different configuration information of the downlink.

In some embodiments, the processing module 710 is further configured to determine, based on a capability of a terminal device and link quality of the plurality of SULs and/or resource usage of the plurality of SULs, whether to switch an SUL on which the terminal device camps. The SUL on which the terminal device camps is a first SUL in the plurality of SULs.

In some embodiments, the processing module 710 is further configured to: when a reference signal received power or a signal to interference plus noise ratio of the first SUL is less than a first threshold, or uplink interference is greater than a second threshold, or an uplink bit error rate is greater than a third threshold, or resource usage is greater than a fourth threshold, determine, by the access network device based on the capability of the terminal device and the link quality of the plurality of SULs and/or the resource usage of the plurality of SULs, whether to switch the SUL on which the terminal device camps.

In some embodiments, the plurality of SULs include the first SUL and a second SUL. The processing module 710 is configured to: when the capability of the terminal device supports the second SUL, and link quality of the first SUL is lower than link quality of the second SUL, and/or resource usage of the first SUL is greater than resource usage of the second SUL, determine to switch the SUL on which the terminal device camps from the first SUL to the second SUL.

In some embodiments, one logical cell includes one SUL and the downlink, and different SULs correspond to different logical cells.

It can be understood that the processing module 710 in this embodiment of this application may be implemented by a processor or a processor-related circuit component, and the transceiver module 720 may be implemented by a transceiver or a transceiver-related circuit component.

An embodiment of this application further provides another communication apparatus. The communication apparatus may use a same structure as that in the embodiment shown in FIG. 7. The communication apparatus is configured to perform a method for configuring switching between a plurality of SULs. A processing module is configured to determine, based on a capability of a terminal device and link quality of a plurality of SULs and/or resource usage of a plurality of SULs, whether to switch an SUL on which a terminal device camps. When determining to switch the SUL on which the terminal device camps, the processing module sends a first message to the terminal device by using a transceiver module, where the first message is used to reconfigure an SUL on which the terminal device is to camp.

An embodiment of this application further provides still another communication apparatus. The communication apparatus may use a same structure as that in the embodiment shown in FIG. 7. The communication apparatus is configured to perform another supplementary uplink SUL configuration method. A processing module is configured to determine a synchronization signal block SSB. The SSB includes configuration information of one SUL. The transceiver module is configured to broadcast the SSB on a downlink. The downlink operates on an FDD frequency band.

Figure 8:
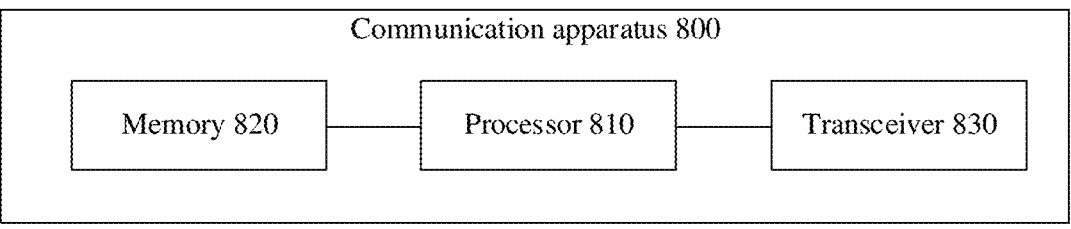
FIG. 8 is a schematic diagram of a communication apparatus 800 according to an embodiment of this application.

As shown in FIG. 8, an embodiment of this application further provides a communication apparatus 800. The communication apparatus 800 includes a processor 810, a memory 820, and a transceiver 830. The memory 820 stores instructions or a program, and the processor 810 is configured to execute the instructions or the program stored in the memory 820. When the instructions or the program stored in the memory 820 are or is executed, the processor 810 is configured to perform an operation performed by the processing module 710 in the foregoing embodiment, and the transceiver 830 is configured to perform an operation performed by the transceiver module 720 in the foregoing embodiment.

It can be understood that the communication apparatus 700 or the communication apparatus 800 according to embodiments of this application may correspond to the access network device in any one of the embodiments in FIG. 3 to FIG. 6 in embodiments of this application. In addition, operations and/or functions of modules in the communication apparatus 700 or the communication apparatus 800 are separately used to implement corresponding procedures of the method in any one of the embodiments in FIG. 3 to FIG. 6. For brevity, details are not described herein again.

Figure 9:
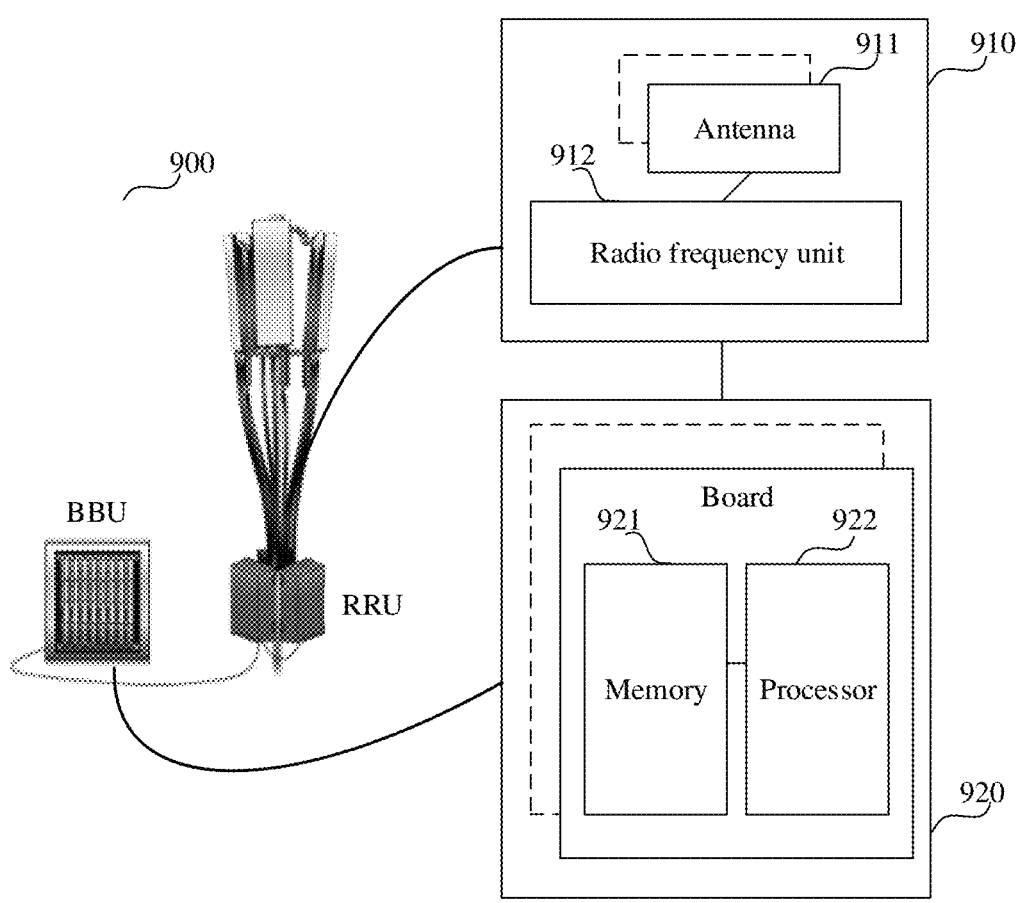
FIG. 9 is a schematic diagram of a communication apparatus 900 according to an embodiment of this application.

When the apparatus in this embodiment is an access network device, the access network device may be shown in FIG. 9. An apparatus 900 includes one or more radio frequency units, such as a remote radio unit (RRU) 910 and one or more baseband units (BBUs) (which may also be referred to as digital units, DUs) 920. The RRU 910 may be referred to as a transceiver module, and corresponds to the transceiver module 720 in FIG. 7. Optionally, the transceiver module may also be referred to as a transceiver machine, a transceiver circuit, a transceiver, or the like, and may include at least one antenna 911 and a radio frequency unit 912. The RRU 910 is mainly configured to send and receive a radio frequency signal, and perform conversion between the radio frequency signal and a baseband signal. For example, the RRU 910 is configured to broadcast a plurality of SSBs. The BBU 910 is mainly configured to perform baseband processing, control a base station, and so on. The RRU 910 and the BBU 920 may be physically disposed together, or may be physically disposed separately, namely, a distributed base station. Optionally, the RRU 910 and the BBU 920 may form an active antenna unit (AAU).

The BBU 920 is a control center of the base station, and may also be referred to as a processing module. The BBU 920 may correspond to the processing module 710 in FIG.

7, and is mainly configured to implement a baseband processing function such as channel coding, multiplexing, modulation, or spreading. For example, the BBU (the processing module) may be configured to control the base station to perform operation procedures related to the access network device in the foregoing method embodiments, for example, configured to determine a plurality of SSBs.

In an example, the BBU 950 may include one or more boards, and a plurality of boards may jointly support a radio access network (such as an LTE network) of a single access standard, or may separately support radio access networks (such as an LTE network, a 5G network, or another network) of different access standards. The BBU 920 further includes a memory 921 and a processor 922. The memory 921 is configured to store necessary instructions and data. The processor 922 is configured to control the base station to perform a necessary action, for example, configured to control the base station to perform operation procedures related to the access network device in the foregoing method embodiments. The memory 921 and the processor 922 may serve one or more boards. In other words, a memory and a processor may be disposed on each board. Alternatively, a plurality of boards may share a same memory and a same processor. In addition, a necessary circuit may further be disposed on each board.

FIG. 9 is a schematic diagram of an access network device. Notably, the access network device in this application may use an architecture in which a CU and a DU are separated. The CU may include a processor and a memory, and the DU may include a processor, a memory, an RRU, and an antenna. The CU and the DU may perform interaction through an interface, and the DU may transmit an uplink signal and/or a downlink signal to the terminal through the antenna. For example, the CU may perform step 301, and the DU may perform step 302. The CU may perform steps 501 and 502, and the DU may perform step 503. The CU may perform step 601, and the DU may perform step 602.

Figure 10:
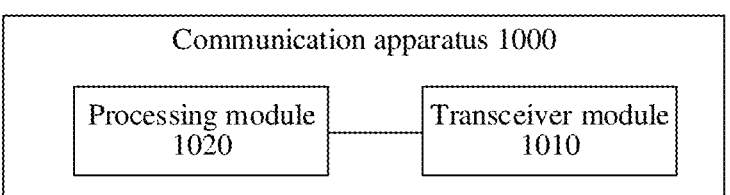
FIG. 10 is a schematic diagram of a communication apparatus 1000 according to an embodiment of this application.

FIG. 10 is a schematic block diagram of a communication apparatus 1000 according to an embodiment of this application. The communication apparatus 1000 may include:

a transceiver module 1010, configured to receive, on a downlink, a plurality of synchronization signal blocks SSBs sent by the access network device, where each of the plurality of SSBs includes configuration information of one or more SULs; and a processing module 1020, configured to camp on one of the plurality of SULs.

In some embodiments, the plurality of SSBs occupy different time domain resources, or the plurality of SSBs occupy different frequency domain resources.

In some embodiments, each of the plurality of SSBs includes configuration information of the downlink, and the plurality of SSBs include different configuration information of the downlink.

It can be understood that the processing module 1020 in this embodiment of this application may be implemented by a processor or a processor-related circuit component, and the transceiver module 1010 may be implemented by a transceiver or a transceiver-related circuit component.

Figure 11:
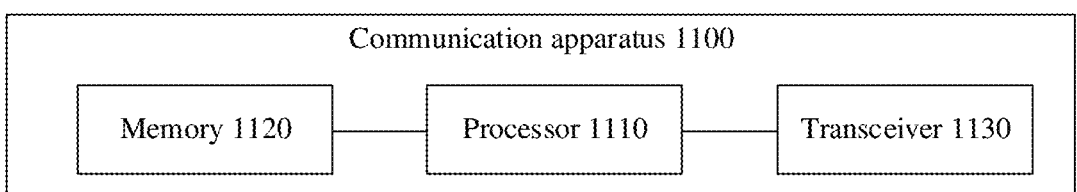
FIG. 11 is a schematic diagram of a communication apparatus 1100 according to an embodiment of this application.

As shown in FIG. 11, an embodiment of this application further provides a communication apparatus 1100. The communication apparatus 1100 includes a processor 1110, a memory 1120, and a transceiver 1130. The memory 1120 stores instructions or a program. The processor 1110 is configured to execute the instructions or the program stored in the memory 1120. When the instruction or the program stored in the memory 1120 are or is executed, the processor

1110 is configured to perform an operation performed by the processing module 1020 in the foregoing embodiment, and the transceiver 1130 is configured to perform an operation performed by the transceiver module 1010 in the foregoing embodiment.

It can be understood that the communication apparatus 1000 or the communication apparatus 1100 according to embodiments of this application may correspond to the terminal device in any one of the embodiments in FIG. 3 to FIG. 6 in embodiments of this application. In addition, operations and/or functions of modules in the communication apparatus 1000 or the communication apparatus 1100 are separately used to implement corresponding procedures of the methods in FIG. 3 to FIG. 6. For brevity, details are not described herein again.

It can be understood that, the processor mentioned in embodiments of this application may be a central processing unit (CPU), or may be another general-purpose processor, a digital signal processor (DSP), an application-specific integrated circuit (ASIC), a field programmable gate array (FPGA), or another programmable logic device, a discrete gate or a transistor logic device, a discrete hardware component, or the like. The general-purpose processor may be a microprocessor, or the processor may be any conventional processor or the like.

It may be understood that the memory mentioned in embodiments of this application may be a volatile memory or a nonvolatile memory, or may include a volatile memory and a nonvolatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative descriptions, many forms of RAMs may be used, for example, a static random access memory (SRAM), a dynamic random access memory (DRAM), a synchronous dynamic random access memory (SDRAM), a double data rate synchronous dynamic random access memory (Double Data Rate SDRAM, DDR SDRAM), an enhanced synchronous dynamic random access memory (ESDRAM), a synchlink dynamic random access memory (Synchlink DRAM, SLDRAM), and a direct rambus random access memory (DR RAM).

Notably, when the processor is a general-purpose processor, a DSP, an ASIC, an FPGA or another programmable logic device, a discrete gate, a transistor logic device, or a discrete hardware component, the memory (a storage module) is integrated into the processor.

Notably, the memory described in this specification aims to include but is not limited to these memories and any memory of another appropriate type.

It can be understood that sequence numbers of the foregoing processes do not mean execution sequences in various embodiments of this application. The execution sequences of the processes should be determined according to functions and internal logic of the processes, and should not be construed as any limitation on the implementation processes of embodiments of the present invention.

A person of ordinary skill in the art may be aware that, in combination with the examples described in embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments.

Details are not described herein again.

In the several embodiments provided in this application, it can be understood that the disclosed system, apparatus, and method may be implemented in another manner. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located at one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units may be integrated into one unit. The integrated unit may be implemented in a form of hardware, or may be implemented in a form of a software functional unit.

A person of ordinary skill in the art may be aware that, in combination with the examples described in embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, the procedures or functions according to this application are all or partially generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk), or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A supplementary uplink (SUL) configuration method, the method comprising:
   determining, by an access network device, a plurality of synchronization signal blocks (SSBs), wherein each of the plurality of SSBs comprises configuration information of at least one SUL of a plurality of SULs; and
   broadcasting, by the access network device, the plurality of SSBs on a downlink,
   wherein the configuration information of each of the plurality of SSBs comprises a bandwidth and a frequency of its corresponding at least one SUL, and
   wherein each of the plurality of SSBs further includes configuration information of a normal uplink (NUL).

2. The method according to claim 1, wherein time domain resources occupied by the plurality of SSBs do not overlap each other, or wherein frequency domain resources occupied by the plurality of SSBs do not overlap each other.

3. The method according to claim 1, wherein each of the plurality of SSBs comprises configuration information of the downlink, and wherein the plurality of SSBs comprises different configuration information of the downlink.

4. The method according to claim 3, further comprising determining, by the access network device based on a capability of a terminal device and a link quality of the plurality of SULs or a resource usage of the plurality of SULs, whether to switch a SUL on which the terminal device camps, wherein the SUL on which the terminal device camps is one of the plurality of SULs.

5. The method according to claim 4, wherein determining whether to switch the SUL comprises determining whether to switch the SUL when a reference signal receive power or a signal to interference plus noise ratio of the SUL on which the terminal device camps is less than a first threshold, or uplink interference is greater than a second threshold.

6. The method according to claim 4, wherein determining whether to switch the SUL comprises determining whether to switch the SUL when an uplink bit error rate is greater than a third threshold or the resource usage is greater than a fourth threshold.

7. The method according to claim 4,
   wherein the plurality of SULs comprises a first SUL and a second SUL, the first SUL being the SUL on which the terminal device camps, and
   wherein determining whether to switch the first SUL on which the terminal device camps comprises determining, by the access network device, to switch the first SUL from the first SUL to the second SUL when the capability of the terminal device supports the second SUL and when a the link quality of the first SUL is lower than a link quality of the second SUL or a resource usage of the first SUL is greater than a resource usage of the second SUL.

8. The method according to claim 1, wherein each SUL of the plurality of SULs and the downlink correspond to one logical cell, and different SULs correspond to different logical cells.

9. A communication apparatus comprising:
a memory; and
at least one processor configured to execute a computer program stored in the memory, the computer program including instructions for performing the method of claim 1.

10. A communication apparatus comprising:
at least one processor configured to determine a plurality of synchronization signal blocks (SSBs), wherein each of the plurality of SSBs comprises configuration information of at least one supplemental uplink (SUL) of a plurality of SULs; and
a transceiver configured to broadcast the plurality of SSBs on a downlink,
wherein the configuration information of each of the plurality of SSBs comprises a bandwidth and a frequency of its corresponding at least one SUL, and
wherein each of the plurality of SSBs further includes configuration information of a normal uplink (NUL).

11. The apparatus according to claim 10, wherein time domain resources occupied by the plurality of SSBs do not overlap each other, or wherein frequency domain resources occupied by the plurality of SSBs do not overlap each other.

12. The apparatus according to claim 10, wherein each of the plurality of SSBs comprises configuration information of the downlink, and wherein the plurality of SSBs comprise different configuration information of the downlink.

13. The apparatus according to claim 12,
wherein the processor is further configured to determine, based on a capability of a terminal device and a link quality of the plurality of SULs or a resource usage of the plurality of SULs, whether to switch an SUL on which the terminal device camps, and
wherein the SUL on which the terminal device camps is one of the plurality of SULs.

14. The apparatus according to claim 13, wherein the processor is configured to determine whether to switch the SUL when a reference signal received power or a signal to interference plus noise ratio of the SUL on which the terminal device camps is less than a first threshold, or uplink interference is greater than a second threshold, or an uplink bit error rate is greater than a third threshold, or the resource usage is greater than a fourth threshold.

15. The apparatus according to claim 13,
wherein the plurality of SULs comprises a first SUL and a second SUL,
wherein the first SUL is the SUL on which the terminal device camps, and
wherein the processor is configured to determine to switch the first SUL from the first SUL to the second SUL when the capability of the terminal device supports the second SUL and when a link quality of the first SUL is lower than a link quality of the second SUL or a resource usage of the first SUL is greater than a resource usage of the second SUL.

16. The apparatus according to claim 10, wherein each SUL of the plurality of SULs and the downlink correspond to one logical cell, and different SULs correspond to different logical cells.

17. A supplementary uplink (SUL) configuration method comprising:
receiving, by a terminal device, a plurality of synchronization signal blocks (SSBs) from an access network device on a downlink, wherein each of the plurality of SSBs comprises configuration information of at least one SUL of a plurality of SULs; and
camping, by the terminal device, on one of the plurality of SULs,
wherein the configuration information of each of the plurality of SSBs comprises a bandwidth and a frequency of its corresponding at least one SUL, and
wherein each of the plurality of SSBs further includes configuration information of a normal uplink (NUL).

18. The method according to claim 17, wherein time domain resources occupied by the plurality of SSBs do not overlap each other, or wherein frequency domain resources occupied by the plurality of SSBs do not overlap each other.

19. The method according to claim 17, wherein each of the plurality of SSBs comprises configuration information of the downlink, and wherein the plurality of SSBs comprises different configuration information of the downlink.

20. A communication apparatus comprising:
a memory; and
at least one processor configured to execute a computer program stored in the memory, the computer program including instructions for performing the method of claim 17.

\* \* \* \* \*